Jan. 24, 1956
F. E. DUDLEY
2,731,714
PROCESS FOR REMOVING EXPANDED TUBES
Filed July 25, 1950
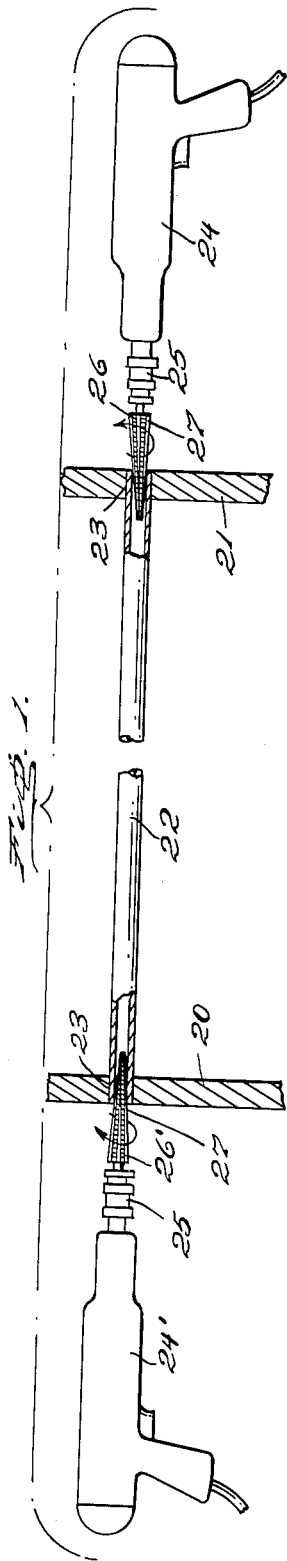
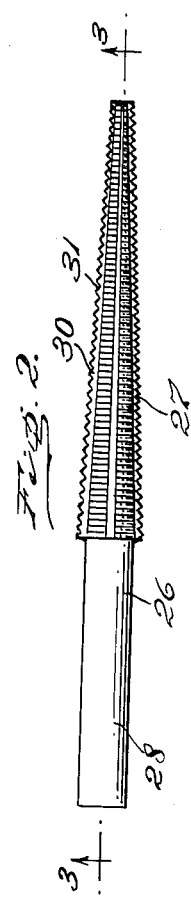
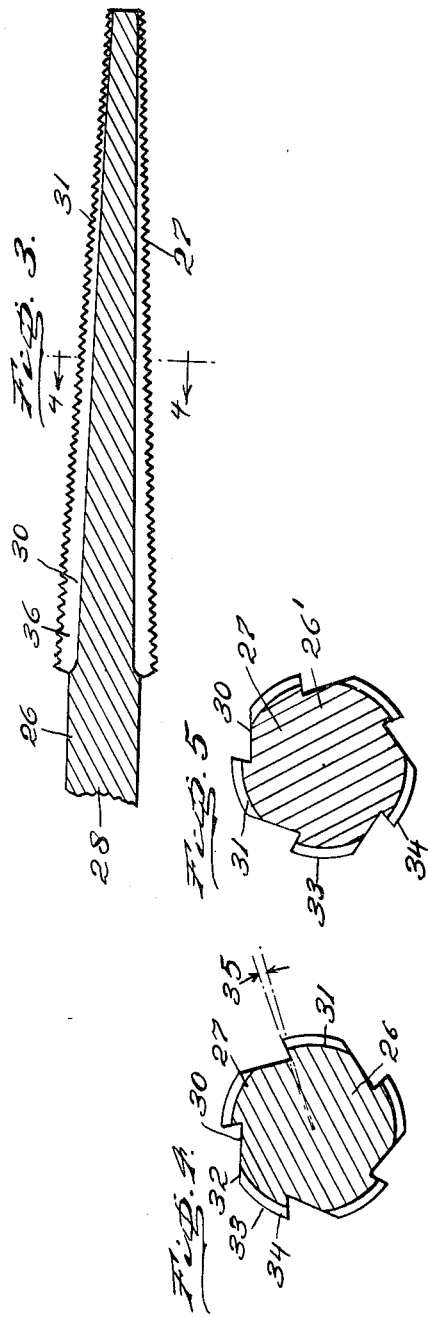
INVENTOR
Frank E. Dudley.
BY
ATTORNEYS.

United States Patent Office 2,731,714
Patented Jan. 24, 1956

2,731,714

PROCESS FOR REMOVING EXPANDED TUBES

Frank E. Dudley, Philadelphia, Pa.

Application July 25, 1950, Serial No. 175,679

1 Claim. (Cl. 29—427)

The present invention relates to the process of removing expanded tubes.

A purpose of the invention is to de-expand or contract a rolled tube so as to facilitate removal and replacement.

A further purpose is to grip a tube internally and turn it to contract the tube, desirably gripping and turning at both ends and desirably at the points of expansion.

A further purpose is to extend the tapered head of a gripping tool into a tube at the point of expansion and turn the tube by turning the tool.

Further purposes appear in the specification and in the claim.

In the drawings I have chosen to illustrate one only of the numerous embodiments in which my invention may appear, selecting the form shown from the standpoints of convenience in illustration, satisfactory operation and clear demonstration of the principles involved.

Figure 1 is a fragmentary elevation, partly in axial section showing the process of loosening a tube in accordance with the invention.

Figure 2 is an enlarged side elevation of one of the tools used in removing the tube in accordance with the invention.

Figure 3 is a section of Figure 2 on the line 3—3.

Figure 4 is a section of Figure 3 on the line 4—4.

Figure 5 is a minor variation shown in section similar to Figure 4 and illustrating a lefthand tool.

Describing in illustration but not in limitation and referring to the drawings:

Many heat exchangers such as condensers, boilers and heaters are made up by extending tubes through openings in tube sheets and sealing the tubes in the tube sheets against leakage. It is common practice to accomplish the seal at one or both ends by forcing rollers around the interior of the tube to cold work the tube and cause it to grip the tube sheet.

When tubes are to be replaced, the common practice is to cut them inside the tube sheet, usually by expanding cutters run in from the outside, and then force out the separated portions of the tube. This involves complicated mechanism and is very likely to cause longitudinal scoring of the openings in the tube sheet, which encourages leakage when a replacement tube is rolled in. Often it is necessary to employ excessive rolling, endangering the new tube, in order to accomplish the seal in a longitudinally scored opening.

The operation of cutting becomes increasingly difficult as the size of the tube decreases, as there is greater difficulty in inserting cutters through the bore of the tube. The complexity of the cutting and pushing mechanism also makes it desirable to improve the technique of removing expanded tubes.

I have discovered that an expanded tube can be loosened up for removal by turning it without applying expanding pressure, so that the tube sheet does work on the tube at the point of expansion to contract the tube. Any marks produced in the tube sheet by this process are circular rather than longitudinal and are not likely to cause difficulty later by leakage.

I grip the tube desirably immediately inside the point at which it is expanded, and preferably at both ends, turning in the same direction. Thus where the tube is expanded at both ends, both ends are contracted or de-expanded at the same time.

The tool itself is of a character which will bite into and grip the tube and then will jam rather than turn indefinitely with respect to the tube, and at the same time when it bites in will not produce serious expansion effects on the tube.

The invention is of widest application in tubes smaller than one-half inch outside diameter down to and including 1/16 inch outside diameter, although it may be used outside this range.

The forward edge of the teeth on the tool, which in the case of a tap would be considered the cutting edge, is provided with an overhang which tends to make the teeth bite into and jam the teeth in the tube.

Considering first the illustration of Figure 1, I there show a heat exchanger such as a condenser, boiler or heater having tube sheets 20 and 21 interconnected by tubes 22, of which only one is shown. Openings 23 in the tube sheets receive the ends of the tube, and in the form shown the tube is expanded or rolled into the tube sheet at both ends.

To remove the tube in accordance with the invention, rotary tools 24 and 24', suitably electric or pneumatic rotary impact tools (of which one well known type is made by Ingersoll Rand Co.), or less desirably rotary tools such as electric or pneumatic drills or tap guns, having chucks 25 rotatably support removing tools 26 and 26', in accordance with the invention. The removing tool is chucked like a drill or tap. The forward tapering head 27 of the removing tool is inserted into each open end of the tube and the tools are simultaneously started to turn in a direction which will turn the tube in the same direction. Rotary impact tool 24 at the right in Figure 1 is shown turning clockwise and rotary impact tool 24' is shown turning counterclockwise as viewed from the respective ends of the tube, so that the tube will be turned in the same direction.

The tools at the corresponding ends are respectively right and left hand tools as later explained.

As the tool starts to turn it first bites into and grips the inside of the tube immediately inside the point where the tube is expanded. The tool then jams and ceases to cut and causes the tube to turn in the tube sheet. The turning of the tube in the tube sheet causes the tube sheet to do work on the tube, de-expanding or contracting the tube. After a short period of turning (of the order of a few hundred revolutions) the expansion gripping of the tube by the tube sheet is largely relaxed and the tube can then readily be withdrawn under very light longitudinal pressure, for example applied by a hammer to a drift. The tube is so thoroughly relaxed in the tube sheet before it is forced out that the danger of causing longitudinal scrape marks in the tube is largely eliminated and any annular scrape marks caused by turning the tube are of little effect when it comes to sealing the new tube by expansion.

The tool is shown in Figures 2 to 4. The head 27 is mounted on a shank 28 which may be of any suitable character, round, square or otherwise, to fit the particular chuck. The tapered head is concentric with the shank, and has a plurality of longitudinal circumferentially spaced flutes 30, of which five are shown, although the number of flutes is to be regarded as a matter of choice and subject to variation. Anywhere from two to twenty flutes may be used.

The flutes are preferably tangential to the circle of the head as best seen in Figure 4. Between the flutes are generally circumferentially extending teeth 31 which are tapering longitudinally in accordance with the taper of the outside of the head, preferably at an angle between 2 and 10 degrees and most desirably about 4 degrees. The teeth may desirably be threads cut on the taper, and in sizes below one-half inch I find that it is desirable to employ threads between 20 and 30 per inch, suitably of isosceles triangle thread formation and conveniently of sharp V points and recesses. The thread depth should not exceed one-half of the wall thickness of the tube to be turned.

Each of the threads has a trailing edge 32 which conforms to the tangential contour of the flute. The outer circumferential edge 33 of each thread conforms to the curvature of the circle at the particular cross section. The forward edge, which is designed particularly to promote jamming, has a forward angle of overhang or protuberance of the outside corner 34 beyond the radially inner portions as shown at 35, the angle being between 1 and 5 degrees in the preferred embodiment and preferably about 2 degrees the forward overhanging edge is straight. This overhang tends to make the teeth bite into but not continuously cut the inside of the tube.

The flute is deeper than the teeth at 36, best seen in Figure 3, in order to further promote jamming by causing accumulation of a limited amount of chip in the base of the flute. The flute is at a slightly more gradual taper than the teeth, in the preferred form, so that at the small end the flute is slightly deeper than the teeth whereas at the large end the flute is not over 4 times as deep as the teeth in the preferred form.

In the middle range where the tool will chiefly be used, the flute is of the order of twice to three times as deep as the teeth.

The form of Figures 2 to 4 is a righthand tool and the form of Figure 5 is a lefthand tool which is in every respect an opposite counterpart, including a left hand thread on the teeth.

The material used for the tool may be any suitable tool steel, of which AISI 52100 is a typical example, hardened and drawn.

In operation the tool is chucked in the rotary impact device, and then inserted into the tube. Operations desirably begin at both ends simultaneously, although less desirably operations can be carried on from one end alone, especially when the tube is expanded at only one end.

The initial turning of the tool with respect to the inside of the tube causes the forward overhanging corners 34 of the teeth to bite into the tube. Due to the overhang angle at 35 and due also to the fact that the flute is tangential and not hollowed as in tap practice, and due to the fact that the flute is recessed below the teeth not over 4 times the tooth depth, the tool quickly jams or stalls and then forces the tube to turn. The depth of the teeth should not exceed a fraction of the tube wall, in preferable practice it should not be over one-half the tube wall of the thinnest tube which is to be removed by the tool.

In view of my invention and disclosure variations and modifications to meet individual whim or particular need will doubtless become evident to others skilled in the art, to obtain all or part of the benefits of my invention without copying the process shown, and I, therefore, claim all such insofar as they fall within the reasonable spirit and scope of my claim.

Having thus described my invention what I claim as new and desire to secure by Letters Patent is:

The process of removing a tube which has been rolled-in and thereby expanded by cold work in a tube sheet, which comprises grasping the tube internally at numerous spaced portions around the internal circumference of the tube at a point closely adjacent to the point of expansion by cold work, and, without further rolling the tube internally, turning the tube continuously in the tube sheet in the same direction, thereby reducing the exterior diameter of the tube and removing the expansion effect due to the previous cold work, and then pulling out the tube.

References Cited in the file of this patent

UNITED STATES PATENTS

| Number | Name | Date |
| --- | --- | --- |
| 1,381,101 | Albertson | June 14, 1921 |
| 1,462,305 | Snyder | July 17, 1923 |
| 1,777,936 | Roberts | Oct. 7, 1930 |
| 1,863,046 | Githens et al. | June 14, 1930 |
| 1,873,250 | Adolph | Aug. 23, 1932 |
| 2,106,741 | Herbert | Feb. 1, 1938 |
| 2,200,528 | Armstrong | May 14, 1940 |
| 2,291,795 | Colt | Aug. 4, 1942 |
| 2,300,914 | Flindt | Nov. 3, 1942 |
| 2,411,246 | Clapper | Nov. 19, 1946 |
| 2,487,331 | Greene | Nov. 8, 1949 |
| 2,526,900 | Remington | Oct. 24, 1950 |
| 2,547,986 | Van Dermark | Apr. 10, 1951 |
| 2,551,652 | Vreeland | May 8, 1951 |